United States Patent
Smith et al.

(10) Patent No.: US 12,346,924 B2
(45) Date of Patent: Jul. 1, 2025

(54) REWARD-BASED REAL-TIME COMMUNICATION SESSION

(71) Applicant: Snap Inc., Santa Monica, CA (US)

(72) Inventors: Brian Anthony Smith, Brentwood, NY (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/480,513

(22) Filed: Sep. 21, 2021

(65) Prior Publication Data

US 2022/0172239 A1 Jun. 2, 2022

Related U.S. Application Data

(60) Provisional application No. 63/119,476, filed on Nov. 30, 2020.

(51) Int. Cl.
*G06Q 30/02* (2023.01)
*G06Q 30/0207* (2023.01)
*H04L 65/1069* (2022.01)

(52) U.S. Cl.
CPC ..... *G06Q 30/0207* (2013.01); *H04L 65/1069* (2013.01)

(58) Field of Classification Search
CPC .............. G06Q 30/0207; H04L 65/1069
See application file for complete search history.

(56) References Cited

U.S. PATENT DOCUMENTS

| 8,264,529 | B2 | 9/2012 | Goulart et al. |
| 8,412,773 | B1 * | 4/2013 | Chapweske ......... H04L 12/1818 709/227 |
| 8,451,994 | B2 | 5/2013 | Abuan et al. |
| 8,520,072 | B1 | 8/2013 | Slavin et al. |

(Continued)

FOREIGN PATENT DOCUMENTS

| CN | 106126067 A | 11/2016 |
| CN | 106663411 A | 5/2017 |

(Continued)

OTHER PUBLICATIONS

Johnson et al., "And Today's Top Donator is": How Live Streamers on Twitch.tv Monetize and Gamify Their Broadcasts, 2019, Social Media + Society, 5(4). https://doi.org/10.1177/2056305119881694 (Year: 2019).*

(Continued)

*Primary Examiner* — John Van Bramer
(74) *Attorney, Agent, or Firm* — Schwegman Lundberg & Woessner, P.A.

(57) ABSTRACT

Aspects of the present disclosure involve a system comprising a computer-readable storage medium storing at least one program, method, and user interface to facilitate reward-based real-time communication between multiple users over a network. receiving, from a first device of a first user, a request for a real-time communication session. A request for a real-time communication session is received from a first device of a first user. Based on the request, the real-time communication session is established between the first user and a second user. A reward associated with participation by the second user in the real-time communication session is determined and provided to the second user.

20 Claims, 11 Drawing Sheets

(56) References Cited

U.S. PATENT DOCUMENTS

| | | | |
|---|---|---|---|
| 8,675,071 | B1 | 3/2014 | Slavin et al. |
| 8,810,657 | B1 | 8/2014 | Slavin et al. |
| 8,874,090 | B2 | 10/2014 | Abuan et al. |
| 8,937,661 | B1 | 1/2015 | Slavin et al. |
| 9,148,702 | B1* | 9/2015 | Ko .................. H04N 21/47214 |
| 9,560,223 | B2 | 1/2017 | Johnson et al. |
| 9,747,012 | B1 | 8/2017 | Moczydlowski |
| 9,830,567 | B2 | 11/2017 | Weiss |
| 10,296,722 | B2 | 5/2019 | Rock |
| 10,432,996 | B2 | 10/2019 | Dacus et al. |
| 10,475,106 | B1 | 11/2019 | Tang et al. |
| 10,740,804 | B2 | 8/2020 | Spivack et al. |
| 10,862,838 | B1 | 12/2020 | Bodapati |
| 10,897,564 | B1 | 1/2021 | Smith et al. |
| 11,132,703 | B2 | 9/2021 | Koenig |
| 11,176,484 | B1 | 11/2021 | Dorner |
| 11,249,714 | B2 | 2/2022 | Spivack et al. |
| 11,412,298 | B1 | 8/2022 | Anzalone et al. |
| 11,611,608 | B1 | 3/2023 | Smith et al. |
| 11,880,946 | B2 | 1/2024 | Smith et al. |
| 12,154,230 | B2 | 11/2024 | Smith et al. |
| 2002/0065728 | A1 | 5/2002 | Ogasawara |
| 2010/0118111 | A1* | 5/2010 | Bouazizi ............ H04N 21/4788 |
| | | | 348/E7.083 |
| 2010/0214398 | A1 | 8/2010 | Goulart et al. |
| 2010/0313113 | A1 | 12/2010 | Chen et al. |
| 2011/0249075 | A1 | 10/2011 | Abuan et al. |
| 2011/0249077 | A1 | 10/2011 | Abuan et al. |
| 2011/0249078 | A1 | 10/2011 | Abuan et al. |
| 2011/0249086 | A1 | 10/2011 | Guo et al. |
| 2013/0021373 | A1 | 1/2013 | Vaught et al. |
| 2013/0265378 | A1 | 10/2013 | Abuan et al. |
| 2014/0146084 | A1 | 5/2014 | Polo et al. |
| 2014/0178029 | A1 | 6/2014 | Raheman et al. |
| 2014/0225924 | A1 | 8/2014 | Loxam et al. |
| 2014/0310595 | A1 | 10/2014 | Acharya |
| 2014/0354532 | A1 | 12/2014 | Mullins |
| 2015/0254618 | A1* | 9/2015 | Shivaram ............ G06Q 10/0639 |
| | | | 705/7.19 |
| 2015/0350136 | A1 | 12/2015 | Flynn, III et al. |
| 2016/0192166 | A1 | 6/2016 | Decharms |
| 2017/0026672 | A1 | 1/2017 | Dacus et al. |
| 2017/0337742 | A1 | 11/2017 | Powderly et al. |
| 2018/0005272 | A1 | 1/2018 | Todasco et al. |
| 2018/0089880 | A1 | 3/2018 | Garrido et al. |
| 2018/0114372 | A1 | 4/2018 | Nagy et al. |
| 2018/0167427 | A1* | 6/2018 | Kedenburg, III ...... G06Q 50/01 |
| 2018/0268609 | A1 | 9/2018 | Schneider et al. |
| 2018/0278994 | A1 | 9/2018 | Holden et al. |
| 2018/0300916 | A1 | 10/2018 | Barnett et al. |
| 2018/0322801 | A1 | 11/2018 | Dey et al. |
| 2018/0345129 | A1 | 12/2018 | Rathod |
| 2019/0036989 | A1 | 1/2019 | Eirinberg et al. |
| 2019/0052925 | A1 | 2/2019 | Mcdowell et al. |
| 2019/0080342 | A1 | 3/2019 | Andon et al. |
| 2019/0080344 | A1 | 3/2019 | Faris et al. |
| 2019/0081947 | A1 | 3/2019 | Faris et al. |
| 2019/0087842 | A1 | 3/2019 | Koenig |
| 2019/0107990 | A1 | 4/2019 | Spivack et al. |
| 2019/0107991 | A1 | 4/2019 | Spivack et al. |
| 2019/0108558 | A1 | 4/2019 | Spivack et al. |
| 2019/0108578 | A1 | 4/2019 | Spivack et al. |
| 2019/0147481 | A1 | 5/2019 | Shrivastava |
| 2019/0213619 | A1 | 7/2019 | Andon et al. |
| 2019/0222806 | A1 | 7/2019 | Soppelsa et al. |
| 2019/0251750 | A1 | 8/2019 | Brewer et al. |
| 2019/0370556 | A1 | 12/2019 | Kline et al. |
| 2019/0394533 | A1* | 12/2019 | Chakraborty .... H04N 21/47202 |
| 2020/0019295 | A1 | 1/2020 | Spivack et al. |
| 2020/0026922 | A1 | 1/2020 | Pekelny et al. |
| 2020/0029113 | A1 | 1/2020 | Dacus et al. |
| 2020/0066045 | A1 | 2/2020 | Stahl et al. |
| 2020/0226481 | A1 | 7/2020 | Sim et al. |
| 2021/0074068 | A1 | 3/2021 | Spivack et al. |
| 2021/0319514 | A1 | 10/2021 | Jones |
| 2022/0076492 | A1 | 3/2022 | Smith et al. |
| 2022/0084295 | A1 | 3/2022 | Smith et al. |
| 2022/0086111 | A1 | 3/2022 | Smith et al. |
| 2022/0237878 | A1 | 7/2022 | Tartz et al. |
| 2023/0177775 | A1 | 6/2023 | Dudovitch et al. |
| 2023/0188594 | A1 | 6/2023 | Smith et al. |

FOREIGN PATENT DOCUMENTS

| | | | |
|---|---|---|---|
| CN | 108027738 | A | 5/2018 |
| CN | 108141526 | A | 6/2018 |
| CN | 109034167 | A | 12/2018 |
| CN | 109212755 | A | 1/2019 |
| CN | 111492330 | A | 8/2020 |
| CN | 116076063 | A | 5/2023 |
| CN | 116134797 | A | 5/2023 |
| CN | 116171566 | A | 5/2023 |
| CN | 116584101 | A | 8/2023 |
| KR | 20140088459 | A | 7/2014 |
| WO | 2017072534 | | 5/2017 |
| WO | WO-2018104834 | A1 | 6/2018 |
| WO | 2019055703 | | 3/2019 |
| WO | 2019079826 | | 4/2019 |
| WO | WO-2019079826 | A1* | 4/2019 ....... G06F 16/90332 |
| WO | 2022056118 | | 3/2022 |
| WO | 2022060829 | | 3/2022 |
| WO | 2022061362 | | 3/2022 |
| WO | WO-2022115591 | A1 | 6/2022 |

OTHER PUBLICATIONS

"International Application Serial No. PCT/US2021/050445, International Search Report mailed Dec. 1, 2021", 4 pgs.

"International Application Serial No. PCT/US2021/050445, Written Opinion mailed Dec. 1, 2021", 6 pgs.

"U.S. Appl. No. 16/947,089, Non Final Office Action mailed Feb. 17, 2022", 10 pgs.

"International Application Serial No. PCT/US2021/060803, International Search Report mailed Mar. 1, 2022", 4 pgs.

"International Application Serial No. PCT/US2021/060803, Written Opinion mailed Mar. 1, 2022", 5 pgs.

"International Application Serial No. PCT/US2021/049653, International Search Report mailed Nov. 25, 2021", 5 pgs.

"International Application Serial No. PCT/US2021/049653, Written Opinion mailed Nov. 25, 2021", 5 pgs.

"International Application Serial No. PCT/US2021/071494, International Search Report mailed Nov. 30, 2021", 4 pgs.

"International Application Serial No. PCT/US2021/071494, Written Opinion mailed Nov. 30, 2021", 5 pgs.

"U.S. Appl. No. 16/947,089, Notice of Allowance mailed Oct. 26, 2022", 9 pgs.

"U.S. Appl. No. 16/947,089, Notice of Allowance mailed Nov. 18, 2022", 8 pgs.

"U.S. Appl. No. 17/477,359, Response filed Jan. 11, 2023 to Final Office Action mailed Oct. 11, 2022", 9 pgs.

"U.S. Appl. No. 16/947,089, Final Office Action mailed Jun. 10, 2022", 11 pgs.

"U.S. Appl. No. 16/947,089, Response filed May 17, 2022 to Non Final Office Action mailed Feb. 17, 2022", 9 pgs.

"U.S. Appl. No. 16/947,089, Response filed Oct. 10, 2022 to Final Office Action mailed Jun. 10, 2022", 9 pgs.

"U.S. Appl. No. 17/470,546, Non Final Office Action mailed Sep. 29, 2022", 21 pgs.

"U.S. Appl. No. 17/476,085, Non Final Office Action mailed Sep. 1, 2022", 22 pgs.

"U.S. Appl. No. 17/477,359, Final Office Action mailed Oct. 11, 2022", 13 pgs.

"U.S. Appl. No. 17/477,359, Non Final Office Action mailed Jun. 22, 2022", 12 pgs.

"U.S. Appl. No. 17/477,359, Response filed Sep. 22, 2022 to Non Final Office Action mailed Jun. 22, 2022", 9 pgs.

Heredia, E. A., "5-Smart Home Networking for Content Management", Ecological Design of Smart Home Networks, (2015), 67-85.

(56) References Cited

OTHER PUBLICATIONS

"U.S. Appl. No. 17/470,546, Final Office Action mailed May 11, 2023", 29 pgs.
"U.S. Appl. No. 17/470,546, Response filed Jan. 30, 2023 to Non Final Office Action mailed Sep. 29, 2022", 11 pgs.
"U.S. Appl. No. 17/476,085, Final Office Action mailed Feb. 17, 2023", 27 pgs.
"U.S. Appl. No. 17/476,085, Response filed Feb. 2, 2023 to Non Final Office Action mailed Sep. 1, 2022", 11 pgs.
"U.S. Appl. No. 17/476,085, Response filed May 17, 2023 to Final Office Action mailed Feb. 17, 2023", 12 pgs.
"U.S. Appl. No. 17/477,359, Non Final Office Action mailed Mar. 16, 2023", 14 pgs.
"U.S. Appl. No. 17/477,359, Response filed Jun. 16, 2023 to Non Final Office Action mailed Mar. 16, 2023", 11 pgs.
"International Application Serial No. PCT/US2021/049653, International Preliminary Report on Patentability mailed Mar. 23, 2023", 7 pgs.
"International Application Serial No. PCT/US2021/050445, International Preliminary Report on Patentability mailed Mar. 30, 2023", 8 pgs.
"International Application Serial No. PCT/US2021/060803, International Preliminary Report on Patentability mailed Jun. 15, 2023", 7 pgs.
"International Application Serial No. PCT/US2021/071494, International Preliminary Report on Patentability mailed Mar. 30, 2023", 7 pgs.
"U.S. Appl. No. 17/470,546, Non Final Office Action mailed Sep. 14, 2023", 29 pgs.
"U.S. Appl. No. 17/470,546, Response filed Aug. 11, 2023 to Final Office Action mailed May 11, 2023", 12 pgs.
"U.S. Appl. No. 17/476,085, Corrected Notice of Allowability mailed Oct. 26, 2023", 5 pgs.
"U.S. Appl. No. 17/476,085, Notice of Allowance mailed Jul. 17, 2023", 10 pgs.
"U.S. Appl. No. 17/477,359, Final Office Action mailed Oct. 30, 2023", 14 pgs.
"U.S. Appl. No. 18/166,687, Non Final Office Action mailed Oct. 11, 2023", 15 pgs.
"U.S. Appl. No. 17/470,546, Examiner Interview Summary mailed Mar. 6, 2024", 2 pgs.
"U.S. Appl. No. 17/470,546, Notice of Allowance mailed Apr. 4, 2024", 10 pgs.
"U.S. Appl. No. 17/470,546, Response filed Mar. 14, 2024 to Non Final Office Action mailed Sep. 14, 2023", 11 pgs.
"U.S. Appl. No. 17/476,085, Corrected Notice of Allowability mailed Dec. 21, 2023", 2 pgs.
"U.S. Appl. No. 17/477,359, Response filed Apr. 27, 2024 to Final Office Action mailed Oct. 30, 2023", 10 pgs.
"U.S. Appl. No. 18/166,687, Advisory Action mailed Apr. 18, 2024", 3 pgs.
"U.S. Appl. No. 18/166,687, Final Office Action mailed Feb. 14, 2024", 11 pgs.
"U.S. Appl. No. 18/166,687, Response filed Jan. 11, 2024 to Non Final Office Action mailed Oct. 11, 2023", 11 pgs.
"U.S. Appl. No. 18/166,687, Response filed Apr. 5, 2024 to Final Office Action mailed Feb. 14, 2024", 12 pgs.
"Chinese Application Serial No. 202180054782.5, Office Action mailed Mar. 18, 2024", w/ English translation, 18 pgs.
"Chinese Application Serial No. 202180062923.8, Office Action mailed Mar. 20, 2024", w/ English translation, 21 pgs.
"Chinese Application Serial No. 202180054782.5, Request for Reexamination filed Jan. 21, 2025", W/English Claims, 14 pgs.
"European Application Serial No. 21787130.0, Communication Pursuant to Article 94(3) EPC mailed Dec. 17, 2024", 5 pgs.
"European Application Serial No. 21787285.2, Communication Pursuant to Article 94(3) EPC mailed Jan. 24, 2025", 6 pgs.
"European Application Serial No. 21794676.3, Communication Pursuant to Article 94(3) EPC mailed Jan. 27, 2025", 6 pgs.
"Korean Application Serial No. 10-2023-7021691, Notice of Preliminary Rejection mailed Nov. 21, 2024", w/ English translation, 11 pgs.
Liang, Tian, "Key Technology Research of Augmented Reality Based on Deep Learning", Full-text Database of China's Outstanding Master's Degree Theses (Electronic Journals) Information Technology Series, w/ English abstract, (Jul. 15, 2020), 106 pgs.
Schütt, Peer, et al., "Semantic Interaction in Augmented Reality Environments for Microsoft HoloLens", 2019 European Conference on Mobile Robots (ECMR), (Oct. 17, 2019), 6 pgs.
"European Application Serial No. 21840230.3, Communication Pursuant to Article 94(3) EPC mailed May 7, 2025", 5 pgs.
"Korean Application Serial No. 10-2023-7021691, Response filed Mar. 18, 2025 to Notice of Preliminary Rejection mailed Nov. 21, 2024", w/ English claims, 21 pgs.

* cited by examiner

REWARD-BASED REAL-TIME COMMUNICATION SESSION

CLAIM OF PRIORITY

This application claims the benefit of priority to U.S. Provisional Application Ser. No. 63/119,476, filed on Nov. 30, 2020, which is incorporated herein by reference in its entirety.

TECHNICAL FIELD

The present disclosure generally relates to mobile and wearable computing technology. In particular, example embodiments of the present disclosure address systems, methods, and user interfaces to facilitate reward-based real-time communication sessions between users.

BACKGROUND

Many wearable and mobile devices such as "smart" glasses include an embedded camera. Users of these devices often stream video produced by an embedded camera to other users' devices using mobile device software applications and online platforms.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
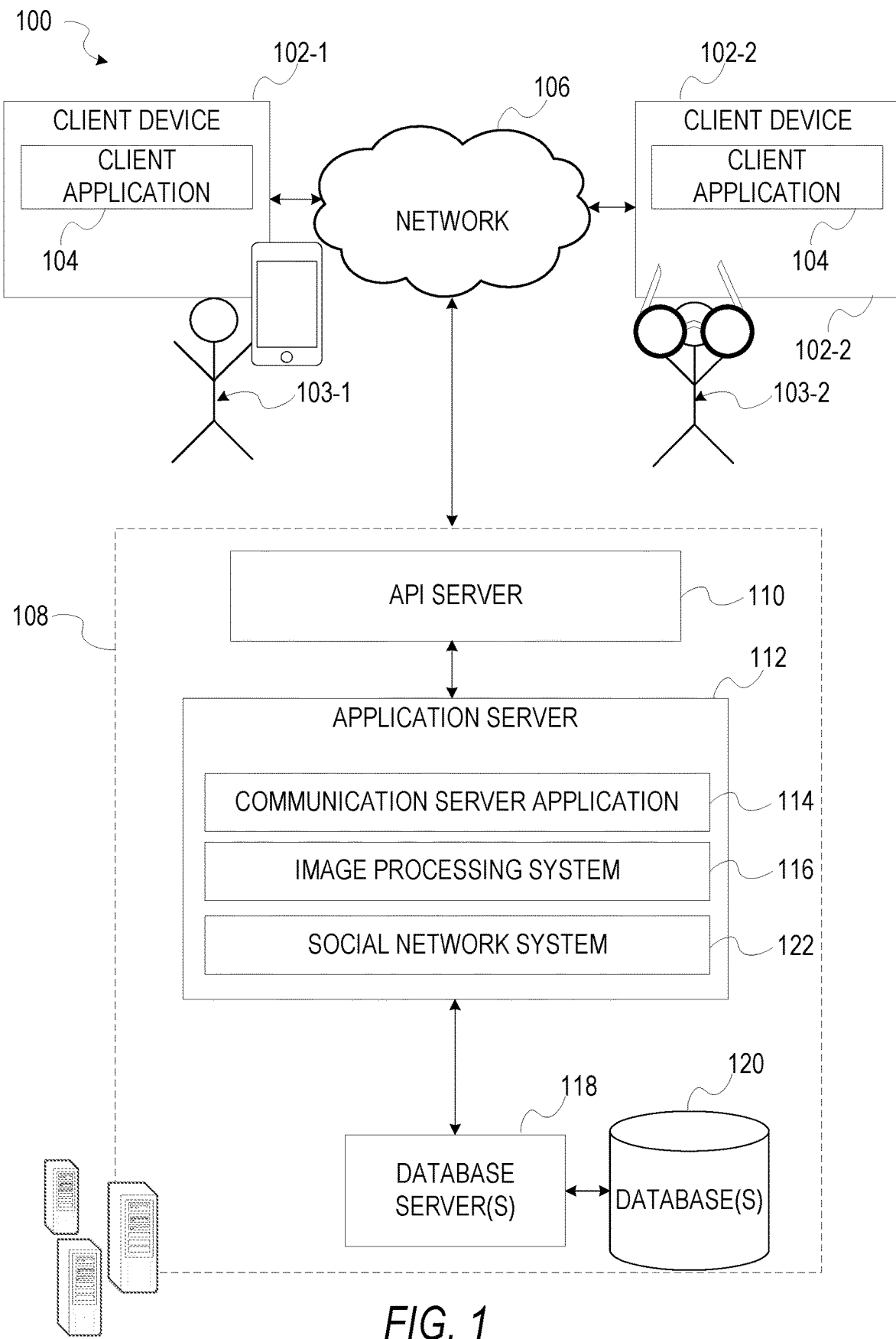
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products for facilitating real-time communication sessions between users. In this context, a request for a real-time communication session is generated based on input from a first user that includes criteria for identifying a second user to be included in the real-time communication session. As an example, the request may specific a target location at or near which the second user is to be located. The request can further indicate a reward to be provided to the second user for participating in the real-time communication session. One or more candidate users are identified based on the request and the candidate users are provided with a notification of the request along with an invitation to join the real-time communication session.

A real-time communication session is established between the first user and a second user that accepts the invitation. For example, the request may specify a target location and the second user that accepts the invitation can be identified based on being proximate to the target location. When a real-time communication session is established between a first user and a second user, a live camera feed that depicts a real-world environment at the location of the second user is presented to the first user. As an example, the second user may be wearing a wearable device that includes a camera and optical elements that include a transparent display through which the real-world environment is visible to the second user. During an active real-time communication session with the second user, the first user can view the real-world environment of the second user via the live camera feed generated by the camera of the second user's wearable device and displayed by a device of the first use and the first and second user can communicate verbally using an audio communication link between devices and also using augmented reality-based communication methods.

Upon termination of the real-time communication session, a reward is determined based on the second user's participation in the real-time communication session and provided to the second user. The reward can be based any one or more of: a reward amount specified in the request, a reward rate specified in the request, a reward type specified in the request, a default or baseline amount set for participating in the real-time communication session, a task performed by the second user that is specified in the request, a distance between the second user and the target location at the time of the request, and a duration of the session.

FIG. 1 is a block diagram showing an example communication system 100 for exchanging data (e.g., messages and associated content) over a network. The communication system 100 includes multiple instances of a client device 102 (102-1 and 102-2). Each instance of the client device 102 hosts a number of applications including a communication client application 104. Each communication client application 104 is communicatively coupled to other instances of the communication client application 104 and a communication server system 108 via a network 106 (e.g., the Internet).

A communication client application 104 is able to communicate and exchange data with another communication client application 104 and with the communication server system 108 via the network 106. The data exchanged between communication client application 104, and between a communication client application 104 and the communication server system 108, includes functions (e.g., commands to invoke functions) as well as payload data (e.g., text, audio, video or other multimedia data).

The communication server system 108 provides server-side functionality via the network 106 to a particular communication client application 104. While certain functions of the communication system 100 are described herein as being performed by either a communication client application 104 or by the communication server system 108, the location of certain functionality either within the communication client application 104 or the communication server system 108 is a design choice. For example, it may be technically preferable to initially deploy certain technology and functionality within the communication server system 108, but to later migrate this technology and functionality to the communication client application 104 where a client device 102 has a sufficient processing capacity.

The communication server system 108 supports various services and operations that are provided to the communication client application 104. Such operations include transmitting data to, receiving data from, and processing data generated by the communication client application 104. This data may include, message content, Client Device information, geolocation information, media annotation and overlays, message content persistence conditions, social network information, and live event information, as examples. Data exchanges within the communication system 100 are invoked and controlled through functions available via user interfaces (UIs) of the communication client application 104.

Turning now specifically to the communication server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the communication client application 104 in order to invoke functionality of the application server 112. The Application Program Interface (API) server 110 exposes various functions supported by the application server 112, including account registration, login functionality, the sending of messages, via the application server 112, from a particular communication client application 104 to another communication client application 104, the sending of media files (e.g., images or video) from a communication client application 104 to the communication server application 114, and for possible access by another communication client application 104, the setting of a collection of media data (e.g., story), the retrieval of a list of friends of a user of a Client device 102, the retrieval of such collections, the retrieval of messages and content, the adding and deletion of friends to a social graph, the location of friends within a social graph, and opening an application event (e.g., relating to the communication client application 104).

The application server 112 hosts a number of applications and subsystems, including a communication server application 114, an image processing system 116 and a social network system 122. The communication server application 114 implements a number of message processing technologies and functions, particularly related to the aggregation and other processing of content (e.g., textual and multimedia content) included in messages received from multiple instances of the communication client application 104. As will be described in further detail, the text and media content from multiple sources may be aggregated into collections of content (e.g., called stories or galleries). These collections are then made available, by the communication server application 114, to the communication client application 104. Other processor and memory intensive processing of data may also be performed server-side by the communication server application 114, in view of the hardware requirements for such processing.

The communication server application 114 also facilities real-time communication sessions between users. To establish a real-time communication session between user 103-1 of client device 102-1 and user 103-2 of client device 102-2, the communication server application 114 causes client device 102-1 to display a live camera feed that depicts a real-world environment at the location of the user 103-2. In an example, the client device 102-2 is a wearable device (e.g., smart glasses) worn by the user 103-2 that includes a camera and optical elements that include a transparent display through which the real-world environment is visible to the user 103-2. While the real-time communication session between the users 103-1 and 103-2 is active, the user 103-1 can view the real-world environment of the user 103-2 via the live camera feed generated by the camera of the client device 102-2 and displayed by the client device 102-1. The communication server application 114 also enables the users 103-1 and 103-2 verbally using an audio communication and augmented reality based communication modalities.

In the context of a real-time communication session, a request is generated based on input from an initiating user (e.g., the user 103-1) that specifies one or more parameters for the session such as a target location at which a participating user (e.g., the user 103-2) is to be located. A notification that includes an invitation to join the real-time communication session is provided to one or more users, and the real-time communication session is established between the initiating user and a second user (e.g., the user 103-2 that accepts the invitation. At the conclusion of the real-time communication session, a reward for participating in the real-time communication session is determined and provided to the second user.

The application server 112 also includes an image processing system 116 that is dedicated to performing various image processing operations, typically with respect to images or video generated and displayed by instances of the client device 102.

The social network system 122 supports various social networking functions services, and makes these functions and services available to the communication server application 114. To this end, the social network system 122 maintains and accesses an entity graph within the database 120. Examples of functions and services supported by the social network system 122 include the identification of other users of the communication system 100 with which a particular user has relationships or is "following", and also the identification of other entities and interests of a particular user.

The application server 112 is communicatively coupled to a database server 118, which facilitates access to a database 120 in which is stored data associated with messages processed by the communication server application 114.

Figure 2:
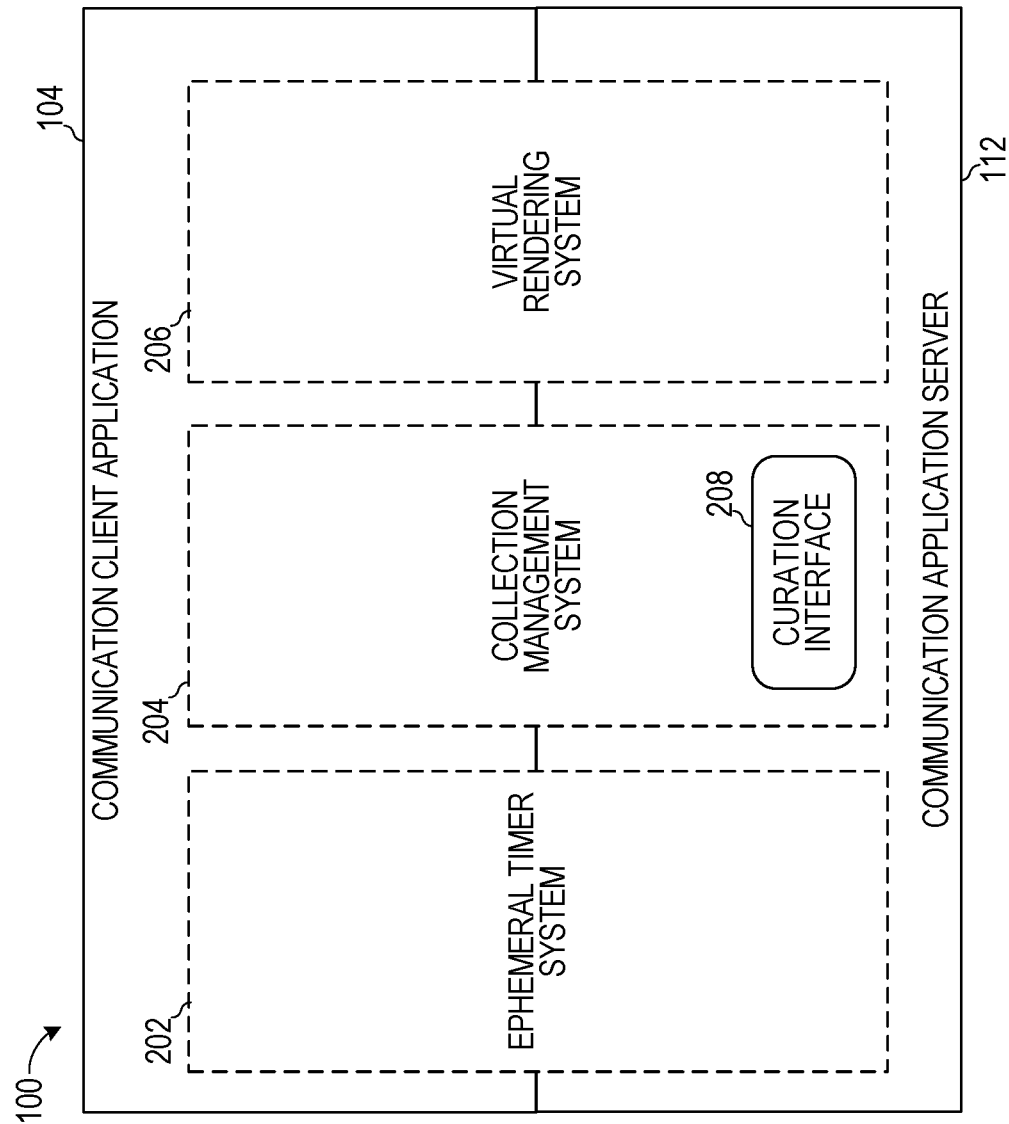
FIG. 2 is a diagrammatic representation of a communication system, in accordance with some example embodiments.

FIG. 2 is block diagram illustrating further details regarding the communication system 100, according to example embodiments. Specifically, the communication system 100 is shown to comprise the communication client application 104 and the application server 112, which in turn embody a number of subsystems, namely an ephemeral timer system 202, a collection management system 204, and a virtual rendering system 206.

The ephemeral timer system 202 is responsible for enforcing temporary access to content permitted by the client application 104 and the application server 112. To this end, the ephemeral timer system 202 incorporates a number of timers that, based on duration and display parameters associated with a message, or collection of messages (e.g., a story), selectively display and enable access to messages and associated content via the client application 104.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection.

The virtual rendering system 206 provides various functions that enable a user to augment or otherwise modify or edit media content (e.g., comprising image data and/or audio data). For example, the virtual rendering system 206 provides functions related to application of virtual content to real-world environments whether through display of media objects on transparent displays through which a real-world environment is visible or through augmenting image data to include media objects overlaid on real-world environments depicted therein. The virtual content may comprise one or more media objects. A media object may include audio and visual content and visual effects. Examples of audio and visual content include pictures, texts, logos, animations, and sound effects. The audio and visual content or the visual effects can be applied to a media data (e.g., a live image stream). The virtual content may be stored in the database(s) 120.

Figure 3:
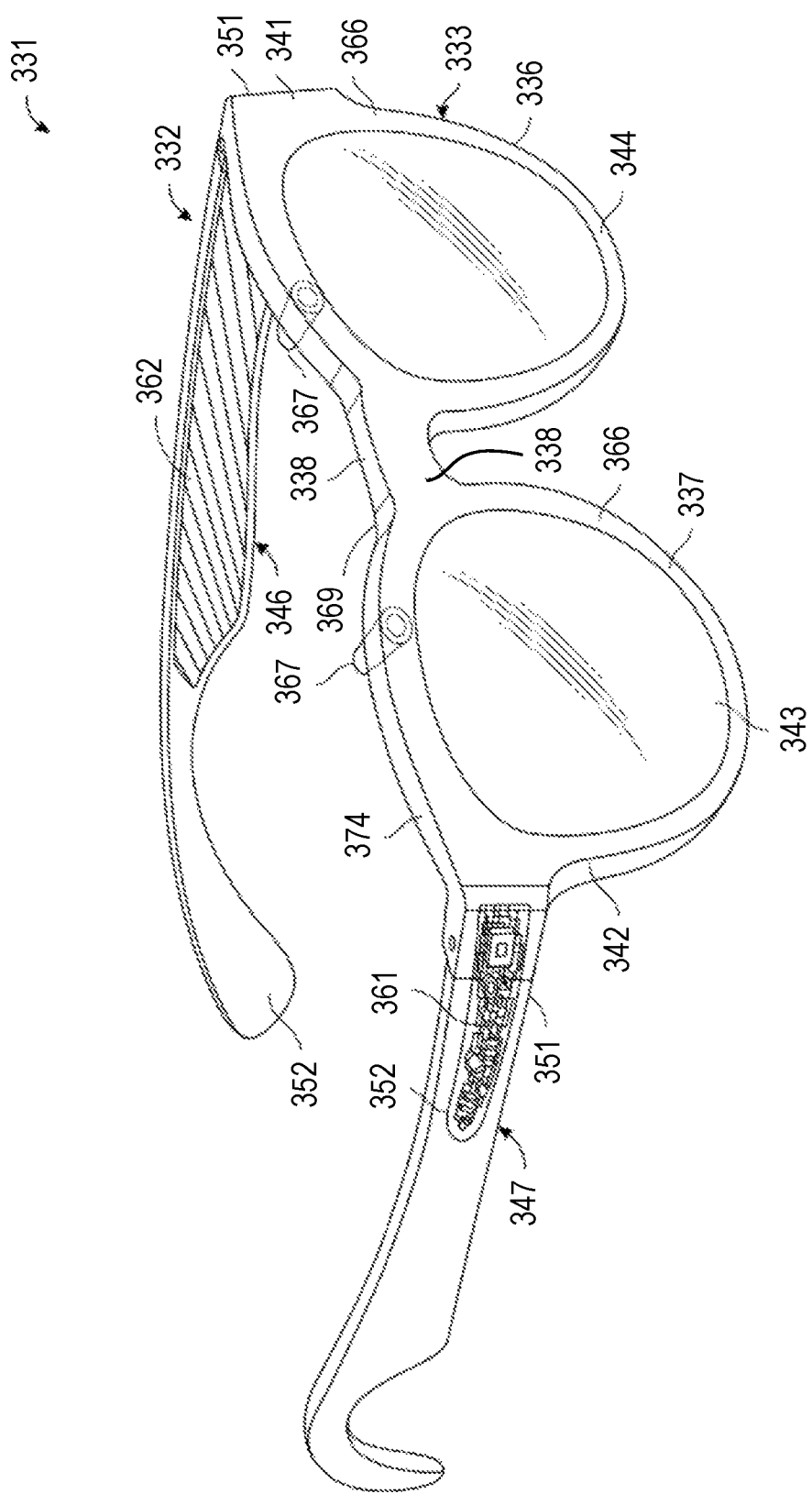
FIG. 3 is a diagram illustrating a wearable device for use in a real-time communication session, according to some example embodiments.

FIG. 3 is a diagram illustrating a wearable device in the example form of glasses 331 for use in an real-time communication session, according to some example embodiments. The glasses 331 can include a frame 332 made from any suitable material such as plastic or metal, including any suitable shape memory alloy. The frame 332 can have a front piece 333 that can include a first or left lens, display, or optical element holder 336 and a second or right lens, display, or optical element holder 337 connected by a bridge 338. The front piece 333 additionally includes a left end portion 341 and a right end portion 342. A first or left optical element 344 and a second or right optical element 343 can be provided within respective left and right optical element holders 336, 337. Each of the optical elements 343, 344 can be a lens, a display (e.g., a transparent display), a display assembly, or a combination of the foregoing. In some embodiments, for example, the glasses 331 are provided with an integrated near-eye display mechanism that enables, for example, display to the user of preview images for visual media captured by cameras 367 of the glasses 331. In some embodiments, integrated near-eye display mechanism allows for display of a media object such that the media object is overlaid on a real-world environment that is viewable through the optical elements 343 and 344.

The frame 332 additionally includes a left arm or temple piece 346 and a right arm or temple piece 347 coupled to the respective left and right end portions 341, 342 of the front piece 333 by any suitable means, such as a hinge (not shown), so as to be coupled to the front piece 333, or rigidly or fixably secured to the front piece 333 so as to be integral with the front piece 333. Each of the temple pieces 346 and 347 can include a first portion 351 that is coupled to the respective end portion 341 or 342 of the front piece 333 and any suitable second portion 352, such as a curved or arcuate piece, for coupling to the ear of the user. In one embodiment, the front piece 333 can be formed from a single piece of material, so as to have a unitary or integral construction. In one embodiment, the entire frame 332 can be formed from a single piece of material so as to have a unitary or integral construction.

The glasses 331 can include a device, such as a computer 361, which can be of any suitable type so as to be carried by the frame 332 and, in one embodiment, of a suitable size and shape so as to be at least partially disposed in one of the temple pieces 346 and 347. In one embodiment, the computer 361 has a size and shape similar to the size and shape of one of the temple pieces 346, 347 and is thus disposed almost entirely if not entirely within the structure and confines of such temple pieces 346 and 347. In one embodiment, the computer 361 can be disposed in both of the temple pieces 346, 347. The computer 361 can include one or more processors with memory, wireless communication circuitry, and a power source. The computer 361 comprises low-power circuitry, high-speed circuitry, and a display processor. Various other embodiments may include these elements in different configurations or integrated together in different ways.

The computer 361 additionally includes a battery 362 or other suitable portable power supply. In one embodiment, the battery 362 is disposed in one of the temple pieces 346 or 347. In the glasses 331 shown in FIG. 3, the battery 362 is shown as being disposed in the left temple piece 346 and electrically coupled using a connection 374 to the remainder of the computer 361 disposed in the right temple piece 347. One or more I/O devices can include a connector or port (not shown) suitable for charging a battery 362 accessible from the outside of the frame 332, a wireless receiver, transmitter, or transceiver (not shown), or a combination of such devices. Given the limited size of the glasses 331 and the computer 361, resource-intensive operations such as video streaming can quickly drain the battery 362 and can be a strain on the one or more processors of the computer 361 that can lead to overheating.

The glasses 331 include digital cameras 367. Although two cameras 367 are depicted, other embodiments contemplate the use of a single or additional (i.e., more than two) cameras. For ease of description, various features relating to the cameras 367 will further be described with reference to only a single camera 367, but it will be appreciated that these features can apply, in suitable embodiments, to both cameras 367.

Consistent with some embodiments, the glasses 331 are an example instance of the client device 102 and may be worn by the user 103-1. Further, in these embodiments, the user 103-2 can view a live camera feed generated by the camera 367 and interact with the user 103-2 by causing virtual content to be added to a real-world environment that is visible to the user 103-1 via the glasses 331. That is, one or more media objects corresponding to virtual content selected by the user 103-2 can be displayed by the integrated near-eye display mechanism that enables such that the media object is overlaid on a real-world environment that is viewable through the optical elements 343 and 344.

In various embodiments, the glasses 331 may include any number of input sensors or peripheral devices in addition to the cameras 367. The front piece 333 is provided with an outward-facing, forward-facing, front, or outer surface 366 that faces forward or away from the user when the glasses 331 are mounted on the face of the user, and an opposite inward-facing, rearward-facing, rear, or inner surface 369 that faces the face of the user (e.g., user 103-1) when the glasses 331 are mounted on the face of the user. Such sensors can include inward-facing video sensors or digital imaging modules such as cameras that can be mounted on or provided within the inner surface 369 of the front piece 333 or elsewhere on the frame 332 so as to be facing the user, and outward-facing video sensors or digital imaging modules such as the cameras 367 that can be mounted on or provided with the outer surface 366 of the front piece 333 or elsewhere on the frame 332 so as to be facing away from the user. Such sensors, peripheral devices, or peripherals can additionally include biometric sensors, location sensors, accelerometers, or any other such sensors.

The glasses 331 further include an example embodiment of a camera control mechanism or user input mechanism comprising a camera control button mounted on the frame 332 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 332 adjacent to its surface for detecting the presence of a user's finger to dispose the touch-sensitive button to the engaged condition when the user touches a finger to the corresponding spot on the outer surface of the frame 332. It will be appreciated that the above-described camera control button and capacitive touch button are but two examples of a haptic input mechanism for single-action control of the camera 367 and that other embodiments may employ different single-action haptic control arrangements.

Figure 4:
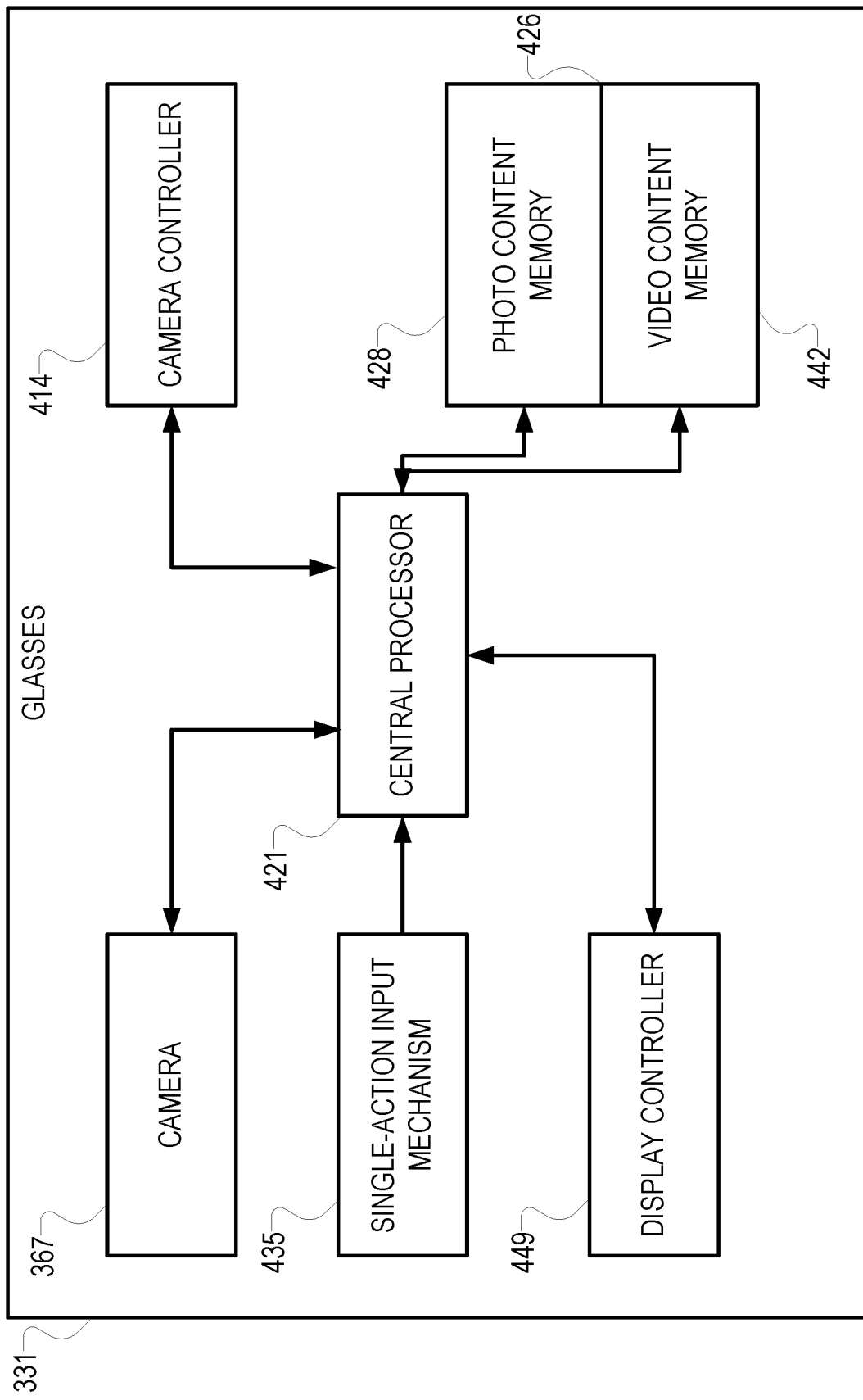
FIG. 4 is a block diagram illustrating aspects of the wearable device, according to some example embodiments.

FIG. 4 is a block diagram illustrating aspects of the wearable device in the example form of the glasses 331, according to some example embodiments. The computer 361 of the glasses 331 includes a central processor 421 in communication with an onboard memory 426. The central processor 421 may be a CPU and/or a graphics processing unit (GPU). The memory 426 in this example embodiment comprises a combination of flash memory and random-access memory.

The glasses 331 further include a camera controller 414 in communication with the central processor 421 and the camera 367. The camera controller 414 comprises circuitry configured to control recording of either photographic content or video content based upon processing of control signals received from the single-action input mechanism that includes the camera control button, and to provide for automatic adjustment of one or more image-capture parameters pertaining to capturing of image data by the camera 367 and on-board processing of the image data prior to persistent storage thereof and/or to presentation thereof to the user for viewing or previewing.

In some embodiments, the camera controller 414 comprises permanently configured circuitry, such as firmware or an application-specific integrated circuit (ASIC) configured to perform the various functions described herein. In other embodiments, the camera controller 414 may comprise a dynamically reconfigurable processor executing instructions that temporarily configure the processor to execute the various functions described herein.

The camera controller 414 interacts with the memory 426 to store, organize, and present image content in the form of photo content and video content. To this end, the memory 426 in this example embodiment comprises a photo content memory 428 and a video content memory 442. The camera controller 414 is thus, in cooperation with the central processor 421, configured to receive from the camera 367 image data representative of digital images produced by the camera 367 in accordance with some of the image-capture parameters, to process the image data in accordance with some of the image-capture parameters, and to store the processed image data in an appropriate one of the photo content memory 428 and the video content memory 442.

The camera controller 414 is further configured to cooperate with a display controller 449 to cause display on a display mechanism incorporated in the glasses 331 of selected photos and videos in the memory 426 and thus to provide previews of captured photos and videos. In some embodiments, the camera controller 414 will manage processing of images captured using automatic bracketing parameters for inclusion in a video file.

A single-action input mechanism 435 is communicatively coupled to the central processor 421 and the camera controller 414 to communicate signals representative of a current state of the camera control button and thereby to communicate to the camera controller 414 whether or not the camera control button is currently being pressed. The camera controller 414 further communicates with the central processor 421 regarding the input signals received from the single-action input mechanism 435. In one embodiment, the camera controller 414 is configured to process input signals received via the single-action input mechanism 435 to determine whether a particular user engagement with the camera control button is to result in a recording of video content or photographic content and/or to dynamically adjust one or more image-capture parameters based on processing of the input signals. For example, pressing of the camera control button for longer than a predefined threshold duration causes the camera controller 414 automatically to apply relatively less rigorous video processing to captured video content prior to persistent storage and display thereof. Conversely, pressing of the camera control button for shorter than the threshold duration in such an embodiment causes the camera controller 414 automatically to apply relatively more rigorous photo stabilization processing to image data representative of one or more still images.

The glasses 331 may be a stand-alone client device that is capable of independent operation or may be a companion device that works with a primary device to offload intensive processing and/or exchange data over the network 106 with the communication server system 108. The glasses 331 may further include various components common to mobile electronic devices such as smart glasses or smart phones (for example, including a display controller for controlling display of visual media (including photographic and video content captured by the camera 367) on a display mechanism incorporated in the device). Note that the schematic diagram of FIG. 4 is not an exhaustive representation of all components forming part of the glasses 331.

Figure 5:
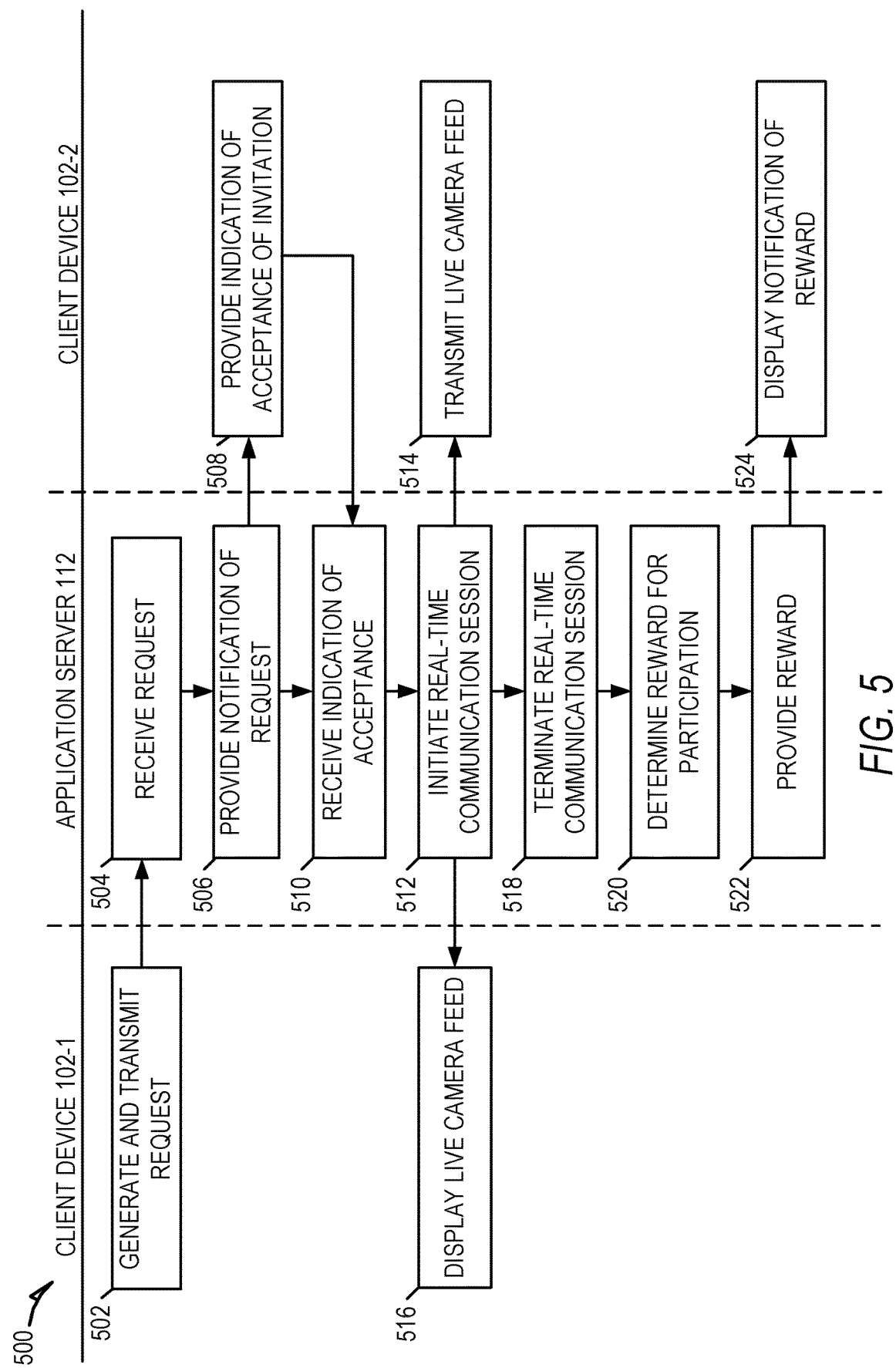
FIG. 5 is an interaction diagrams illustrating example interactions between components of the communication system in performing a method for facilitating a reward-based real-time communication session with a first user, according to example embodiments.
Figure 6:
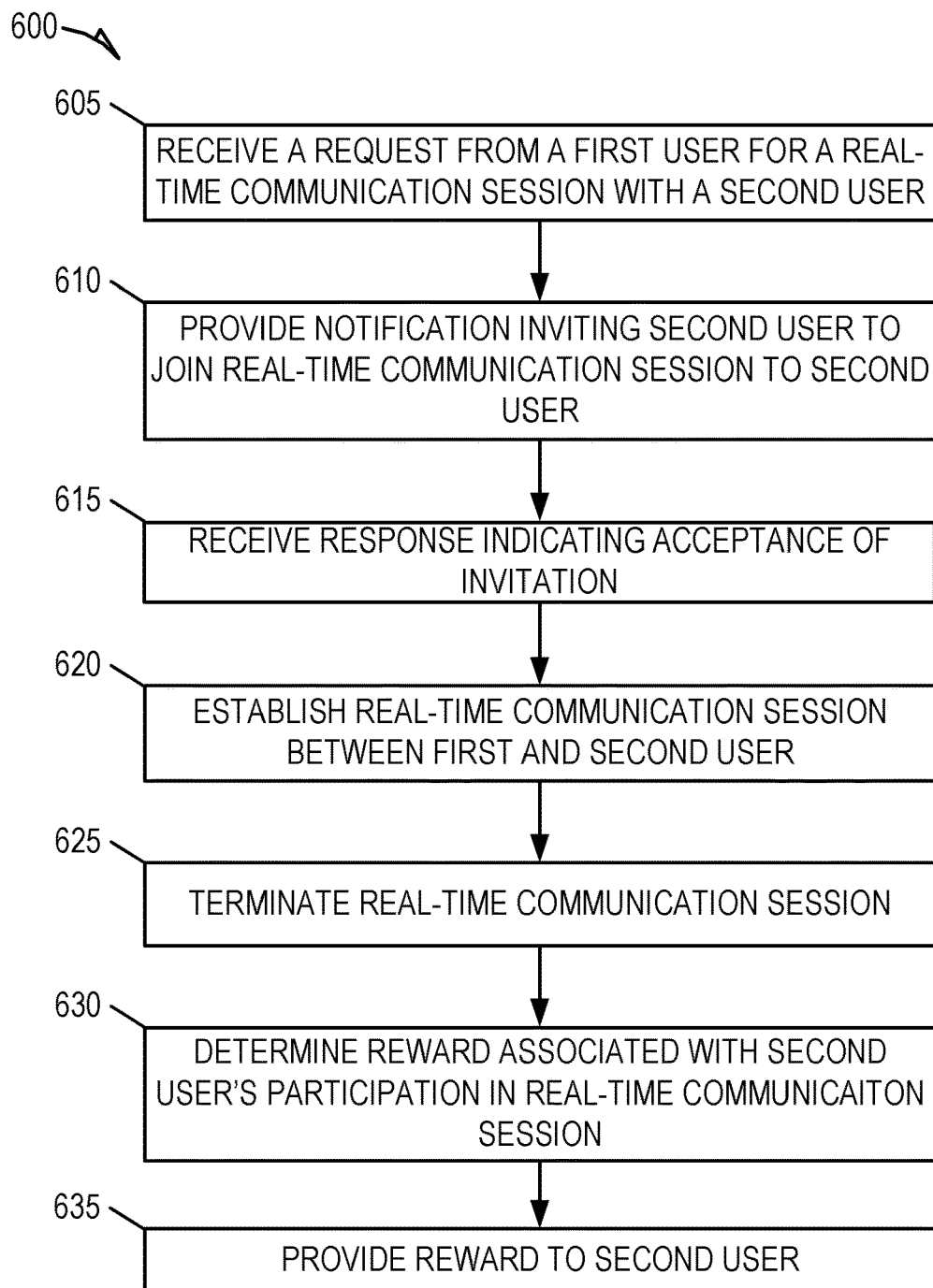
FIGS. 6-9 are flowcharts illustrating operations of the communication system in performing a method for facilitating a reward-based real-time communication session between a first and second user, according to example embodiments.

FIG. 5 is an interaction diagrams illustrating example interactions between a first device (client device 102-1), a second device (client device 102-2), and a server (application server 112) of the communication system in performing a method 600 for facilitating a reward-based real-time communication session between a first user associated with the first device and a second user associated with the second device, according to example embodiments.

As shown in FIG. 5, the method 500 begins at operation 502 where the client device 102-1 generates a request for a real-time communication session and transmits the request to the application server 112. The request is generated based on input received from a first user. The input can be received from a request submission interface presented by the client device 102-1. For example, the application server 112 can provide instructions to the client device 102-1 to display a request submission interface, and the client device 102-1, in turn, displays the request submission interface, and receives input via the request submission interface. The input defines one or more parameters for a real-time communication session with the user 103-1. The one or more parameters can include criteria for a second user that is to be included in the real-time communication session. For example, the request can specify a target location (e.g., a geographic location or feature, a landmark, or an event) at which the second user is to be located, an identifier of a second user, or another attribute of a second user that is to be included in the real-time communication session. The one or more parameters can further include: a session duration; a task to be performed by the second user during the communication session; and a reward amount (e.g., a number of points or a monetary value), rate (e.g., dollars or points per minute), or type (e.g., a currency type or other redeemable points) to be provided to the second user in return for participating in the real-time communication session or performing the task.

In response to receiving the request (at operation 504), the application server 112 provides a notification of the request to the client device 102-2 (at operation 506). The notification includes an invitation that allows the user 103-2 to join a real-time communication session with the user 103-1 and further notifies the user 103-2 of any parameters associated with the real-time communication session such as the target location, a task to be performed, and/or a reward to be provided to the user 103-2 for participating in the real-time communication session. The user 103-2 can be identified based on one or more criteria included in the request. The client device 102-2 can be one of multiple device for which the application server 112 provides the notification. That is, the application server 112 can identify multiple candidate users to fulfill the request, and provide the notification to a client device operation by each user. For example, the application server 112 can identify multiple users that are within a predefined distance of the target location and provide a notification to a device of each such user, and the user who responds first is enabled to fulfil the request. In some instances, the application server 112 only provides notifications of requests to users who have indicated that they are willing to accept requests.

Upon receiving input indicative of acceptance of the invitation by the 103-2, the client device 102-2 provides an indication of the acceptance to the application sever 112, at operation 508. Based on receiving the indication of acceptance (at operation 510), the application server 112 initiates the real-time communication session between the users 103-1 and 103-2 (at operation 512). When a real-time communication session is established, the user 102-1 is able to view a live camera feed (e.g., comprising a real-time image data) generated by the device 102-2 of the user 102-2 while also interacting with the user 102-2 using verbal and augmented reality based communication modalities. Accordingly, in initiating the real-time communication session, the application server 112 triggers activation of a camera associated with the client device 102-2 and causes the client device 102-2 to transmit a live camera feed generated by the camera back to the application server 112 (operation 514). The application server 112 causes the client device 102-1 to display the live camera feed provided by the client device 102-2 (at operation 516) thereby allowing the user 103-1 to view the real-world environment at the location of the user 103-1. The live camera feed may be displayed on the client device 102-1 as part of a user interface that includes a set of selectable virtual content items that can be applied to the real-world environment that is visible to the user 103-2 via the client device 102-2. The application server 112 also enables a real-time audio communication link between the devices that allows the users 103-1 and 103-2 to verbally communicate in real-time.

At operation 518, the application server 112 terminates the real-time communication session between the client device 102-1 and 110-2. In terminating the real-time communication session, the application server 112 terminates the display of the live camera feed on the client device 102-2 and disables the audio communication link between the devices. The application server 112 can terminate the real-time communication session based on user input received from one of the two devices (e.g., input corresponding to a request to terminate the real-time communication link) or based on expiration of a session duration specified in the request.

At operation 520, the application server 112 determines a reward associated with the participation of the user 103-2 in the real-time communication session. The reward may comprise an amount of value corresponding to currency or points, and can be determined based on any one or more of an amount of value specified in the request, a rate specified in the request, an award type specified by the request, a default or baseline amount of value associated with participating in real-time communication session, a duration of the real-time communication session, a task performed by the second user during the session (e.g., based on task type or complexity), or based on a distance between the user 103-2 and the target location at the time of receiving the invitation to join the session.

The application server 112 provides the reward to the user 102-2, at operation 522, and the client device 102-2 displays a notification of the award, at operation 524. The application server 112 may provide the reward by updating a user account associated with the user 103-2 to indicate that the user 103-2 has been provided the reward. Depending on the reward type, the application server 112 may also update a user account associated with the user 102-1 to reflect a deduction of the amount of value corresponding to the reward.

FIGS. 6-9 are flowcharts illustrating operations of the communication system in performing a method 600 for facilitating a reward-based real-time communication sessions between a first user and a second user, according to example embodiments. The method 600 may be embodied in computer-readable instructions for execution by one or more processors such that the operations of the method 600 may be performed in part or in whole by the functional components of the communication system 100; accordingly, the method 600 is described below by way of example with reference thereto. However, it shall be appreciated that at least some of the operations of the method 600 may be deployed on various other hardware configurations than the communication system 100.

At operation 605, the application server 112 receives a request, from a first device (e.g., client device 102-1) of a first user (e.g., user 103-1) for a real-time communication session with a second user. In the context of a real-time communication session, the first user can establish a real-time communication link with the second user to view a real-world environment at the second user's location and interact with the second user using both verbal and augmented reality based communication modalities.

The request can specify one or more parameters for the real-time communication session. The one or more parameters can include criteria for a second user that is to be included in the real-time communication session. For example, the request can specify any one or more of the following configuration parameters: a target location at which the second user is to be located; an identifier or other attribute of a second user to be included in the real-time communication session; a session duration; a task to be performed by the second user during the communication session; and a reward amount (e.g., a number of points or monetary value), rate (e.g., dollars or points per minute), or type (e.g., a currency type or other redeemable points) to be provided to the second user in return for participating in the real-time communication session or performing the task. The target location may, for example, comprise a geographic location or feature, a landmark, or an event. The request may include descriptive information to describe the target location. The descriptive information may, for example, include an identifier such as: an address; a set of cross streets; an identifier of a city, town, or other region; a building identifier, a business identifier, a landmark name; a set of GPS coordinates; an event title; or the like.

The one or more parameters can be specified by the first user via a request submission interface presented on the first device. The request submission interface comprises one or more elements for the parameters of the real-time communication session. Accordingly, the request submission interface may include a combination of input fields, toggles, and other user interface input elements that can be used to specify configuration parameter.

At operation 610, the application server 112 provides a notification of the request to a second device (e.g., client device 102-2). The notification includes an invitation for the second user to join the real-time communication session with the first user. The notification can include an interactive element that allows the second user to accept the invitation and join the real-time communication session. The notification further informs the second user of any parameters of the real-time communication session specified by the first user. For example, the notification can specify any one or more of: a specific location (e.g., address, landmark, intersection, etc.) to which the second user is to travel; a task the second user is to perform; a session duration; and a reward amount (e.g., a number of points or monetary value), rate (e.g., dollars or points per minute), or type (e.g., a currency type or other redeemable points) to be provided to the second user in return for participating in the real-time communication session or performing the task. The notification can provide additional information about the task including, for example, detailed descriptions for completing the task and an estimated time for completing the task. In addition, the notification can include information about the first user.

The notification is sent to the second device of the second user based the second user being identified as satisfying one or more criteria specified in the request. For example, the notification may be sent to the second device based on detecting the second device being within a predefined distance of the target location specified by the request. As another example, the application sever 112 can provide the notification to the second device based on the second user corresponding to an identifier specified by the response. In some examples, the notification is only sent to the second device in response to the second user indicating they are willing to accept requests.

The application server 112 may provide the notification, for example, as a push notification, a notification displayed within a GUI of an application (e.g., client application 104) executing on the second device, a text message, or an email. Depending on the embodiment, the application server 112 may transmit the message to the second device or may transmit a set of instructions to the second device that cause the second device to display the message. As will be discussed in further detail below, the second device may be one of a set of devices to which the application server 112 provides the message.

At operation 615, the application server 112 receives a response that includes an indication of acceptance of the invitation from the second device. Based on receiving the indication of acceptance, the application server 112 establishes the real-time communication session between the first user and the second user, at operation 620. In establishing the real-time communication session, the application server 112 activates a camera coupled to the second device, causes the second device to transmit the live camera feed generated by the camera back to the application server 112, and causes display of the live camera feed on a display of the first device. In some embodiments, the camera is an embedded camera of the second device. In some embodiments, the camera is an embedded camera of a companion device of the second device such as a wearable device (e.g., glasses 331). In causing the live camera feed of the second user to be displayed by the first device, the application server 112 enables the first user to view a real-world environment at the location of the second user (e.g., a location specified in the request) that is visible within the field of view of the camera coupled to second device.

At operation 625, the application server 112 terminates the real-time communication session. In some instances, the application server 112 terminates the real-time communication session based on user input received from one of the two devices (e.g., input corresponding to a request to terminate the real-time communication session). In some instances, the application server 112 may terminate the real-time communication session based on expiration of a session duration specified in the request.

At operation 630, the application server 112 determines a reward associated with the second user's participation in the real-time communication session. As noted above, the reward may comprise a monetary value or redeemable points. The reward may be determined, for example, based on any one or more of an amount of value specified by the first user as part of the request (e.g., a monetary value), a rate specified in the request, an award type specified by the request, a default or baseline amount of value associated with participating in real-time communication session, a duration of the real-time communication session, a task performed by the second user during the session, or based on a distance between the second user and the target location at the time of receiving the invitation to join the session. Accordingly, consistent with some embodiments, the application server 112 can determine the reward by determining a location of the second user based on location data obtained from the second device, and determining a distance between the location of the second user and the target location.

At operation 635, the application server 112 provides the reward to the second user based on the second user's participation in the real-time communication session. The application server 112 may provide the reward by updating a user account associated with the second user to indicate that the user has been provided the reward. For example, the application server 112 may maintain a user account for the second user that allows the second user to accumulate an amount of value (e.g., in actual currency or in points) and in providing the reward, the application server 112 may increase the amount of accumulated value by the amount of value corresponding to the reward. In some embodiments, the application server 112 may also update a user account associated with the first user to reflect a deduction of the amount of value corresponding to the reward from the accumulated value in the user account of the first user.

Figure 7:
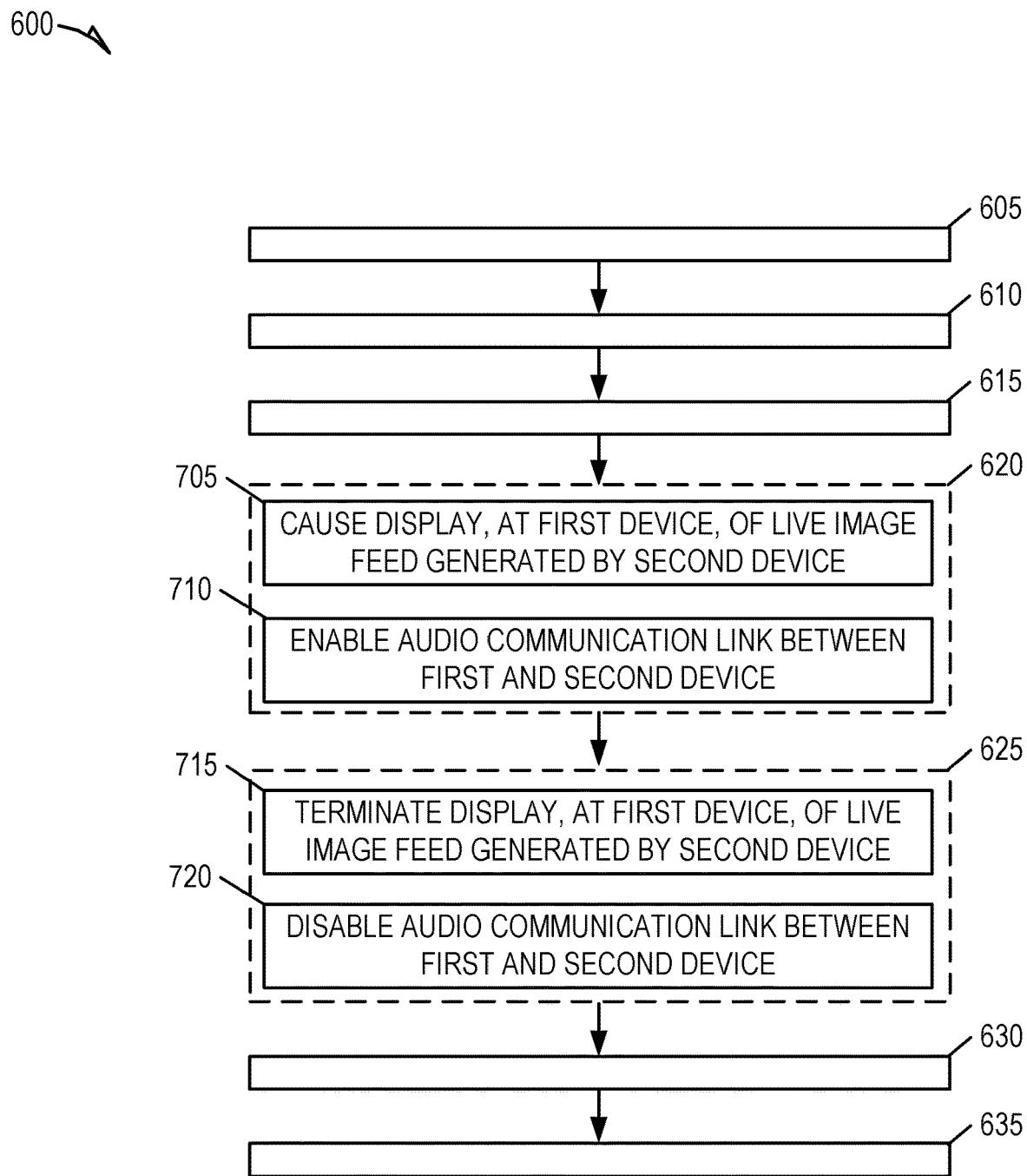

As shown in FIG. 7, the method 600 may, in some embodiments, include operations 705, 710, 715, and 720. Consistent with these embodiments, the operations 705 and 710 may be performed where the application server 112 establishes the real-time communication session between the first and second users. At operation 705, the application server 112 causes display of the live camera feed generated by the first device on the second device. The display of the live camera feed can further include a presentation of information about either the first or second user, an estimate reward to be provided to the second user, an elapsed time or indicator of time remaining. At operation 710, the application server 112 enables a real-time audio communication link between the first and second device. The audio communication link between the first and second device allow the first and second users to communicate verbally and discuss the task in real-time.

Consistent with some embodiments, the operations 715 and 720 may be performed as part of the operation 625, where the application server 112 terminates the real-time communication session between the first and second user. At operation 715, the application server 112 terminates the display of the live camera feed (generated by the second device) on the first device. Upon termination of the live camera feed, the first user is no longer able to view the real-world environment of the second user. An operation 720, the application server 112 disables the audio communication link between the first and second device thereby eliminating the ability for the first and second user to communicate verbally in real-time. In some embodiments, the application server 112 may further cause display of an indicator on the first and/or second device that the real-time communication session has been terminated.

Figure 8:
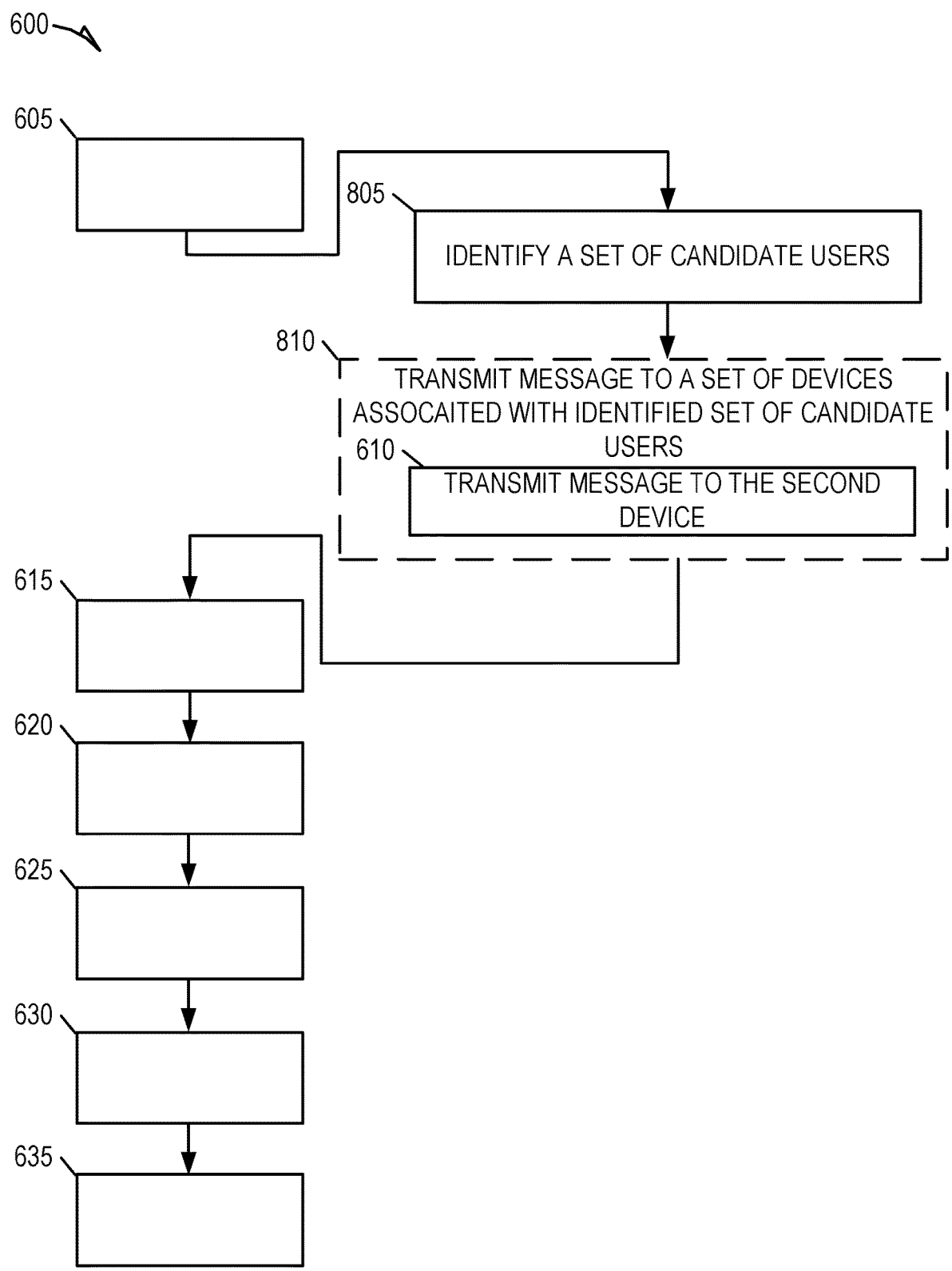

As shown in FIG. 8, the method 600 may, in some embodiments, include operations 805 and 810. Consistent with these embodiments, the operations 805 may be performed prior to operation 710 where the application server 112 transmits the message to the second device associated with the second user.

At operation 805, the application server 112 identifies a set of candidate users to satisfy the request. The application server 112 identifies the set of candidate users based on one or more criteria specified by the request. In an example, the request specifies a target location and the application server 112 identifies a set of users within a predefined distance of the target location. The predefined distance may be a default value or may be specified by the first user as part of the request. The application server 112 can identify the set of candidate users based profile data and/or data obtained from a set of devices associated with the set of users (e.g., GPS data obtained from a GPS component). Furthering the example from above, the application server 112 may identify a set of devices that are within the predefined distance of the target location based on location data received from the devices. The second user is included in the set of candidate users and the second device is included in the set of devices.

Consistent with these embodiments, the operation 610 can be performed as part of the operation 810, where the application server 112 provides the notification to a set of devices associated with the identified set of candidate users. That is, at operation 810, the application server 112 provides the notification to the set of devices and the set of devices included the second device associated with the second user.

Figure 9:
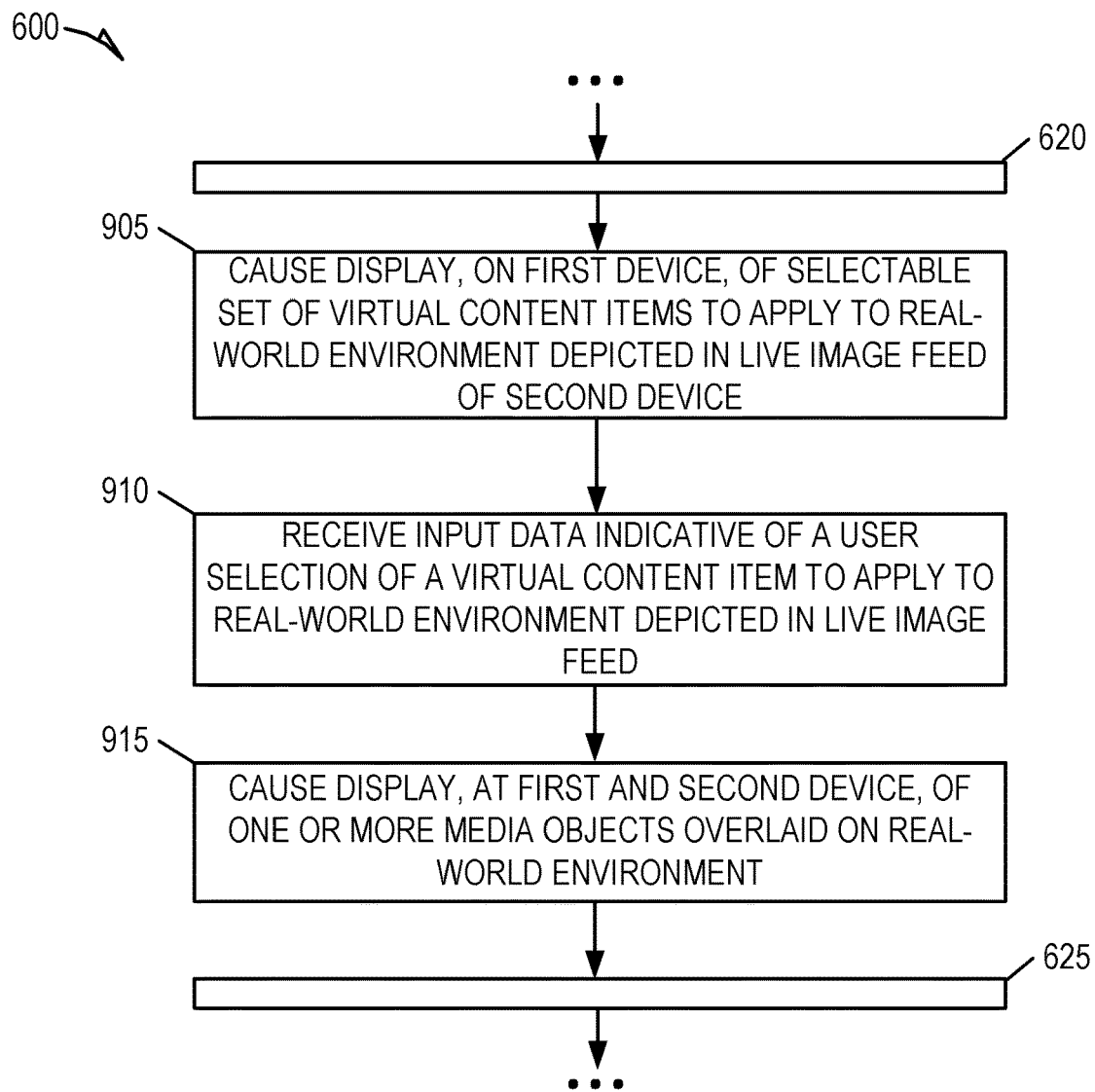

As shown in FIG. 9, the method 600 may, in some embodiments, include operations 905, 910, and 915. Consistent with these embodiments, the operations 905, 910, and 915 can be performed at the real-time communication session is active. That is, the operations 905, 910, and 915 can be performed subsequent to operation 620 and prior to operation 625.

At operation 905, the application server 112 causes display, on the first device, of a set of selectable virtual content items to apply to the real-world environment at a location of the second user that is depicted in the live camera feed provided by the second device. Each virtual content item comprises one or more media objects. Media objects may be two or three dimensional.

At operation 910, the application server 112 receives, from the first device, user input indicative of a selection by the first user of virtual content item from the set of virtual content items to apply to the real-world environment depicted in the live camera feed.

At operation 915, the application server 112 causes both the first and second device to present the one or more media objects overlaid on the real-world environment depicted in the live camera feed provided by the second device based on the selected virtual content item. While the one or more media objects are presented, either user can interact with and manipulate the objects in real-time. The application server 112 may maintain object definition data that defines the display of the virtual content item (i.e., the one or more media objects) and in causing display of the one or more media objects, the application server 112 may provide the first and second devices with the virtual content definition data along with a set of instructions that causes the first and second device to display the one or more media objects overlaid on the real-world environment in accordance with the virtual content definition data in real-time.

As an example of the forgoing, the first user can select an arrow and have the arrow be applied to the real-world environment depicted in the live camera of the second user to point out the target location or other area to the second user. Both the first and second users can interact with and manipulate the arrow in real-time as it displayed, for example, by moving a location of the arrow.

In some embodiments, the second device is a wearable device worn by the second user that includes optical elements that include a transparent display device. Consistent with these embodiments, the application server 112 causes the transparent display device to display the one or more media objects while allowing the second user to continue to view the real-world environment through the device. In this manner, the one or more media objects are presented by the transparent display device overlaid on the real-world environment. However, it shall be appreciated that such information may in the alternative or in addition be presented by a primary device that is coupled to a wearable device. That is, depending on the embodiment, the wearable device of the second user can be a stand-alone device that is capable of independent operation or may be a companion device that works with a primary device to offload intensive processing.

The instructions provided to the first device cause the first device to display an augmented live camera feed that includes the one or more media objects of the virtual content item overlaid on the real-world environment. In some embodiments, the application server 112 may work in conjunction with a client application executing on the first device to augment image data from the live camera feed to include the one or more media objects overlaid on the real-world environment.

Software Architecture

Figure 10:
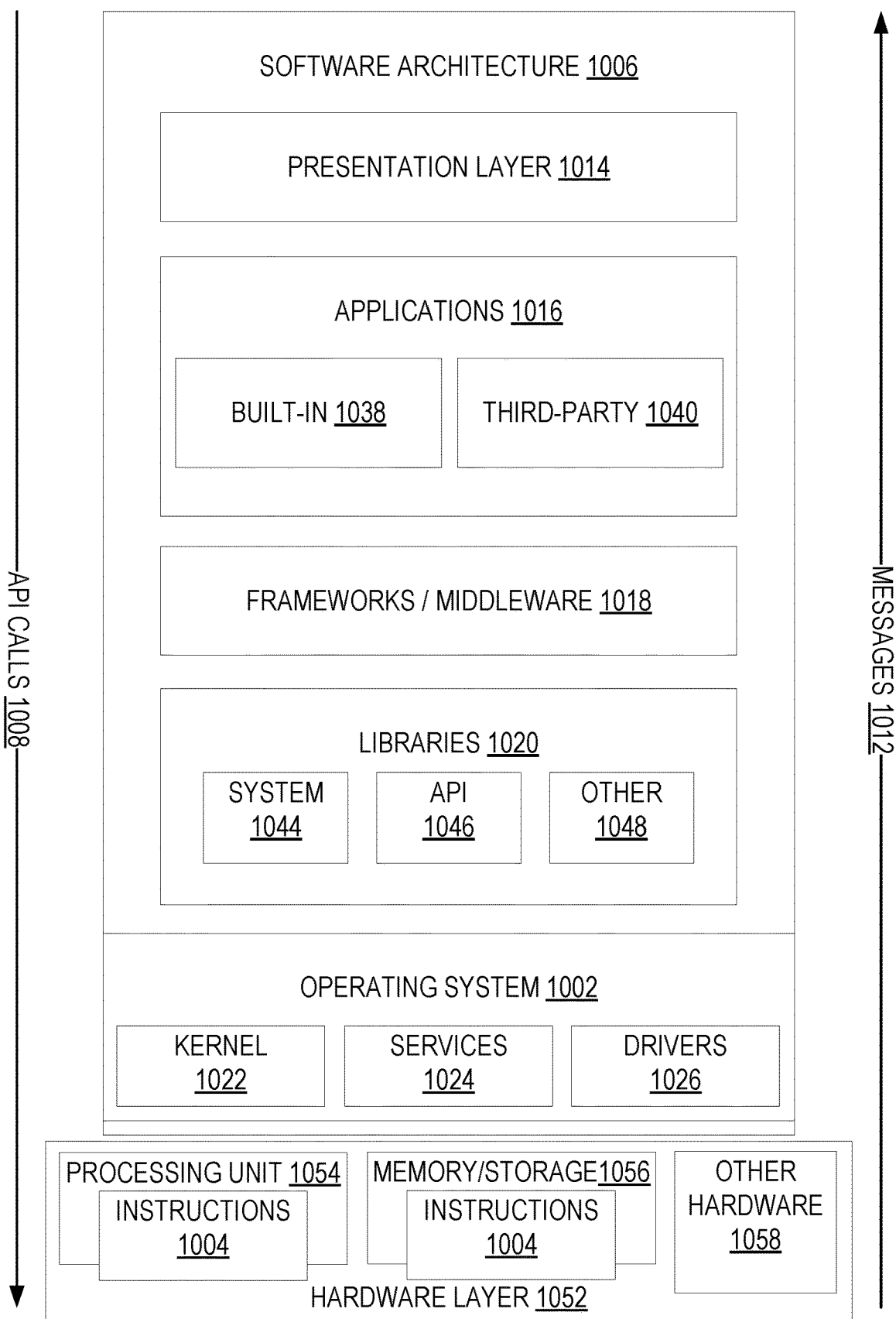
FIG. 10 is a block diagram illustrating a representative software architecture, which may be used in conjunction with various hardware architectures herein described, according to example embodiments.

FIG. 10 is a block diagram illustrating an example software architecture 1006, which may be used in conjunction with various hardware architectures herein described. FIG. 10 is a non-limiting example of a software architecture, and it will be appreciated that many other architectures may be implemented to facilitate the functionality described herein. The software architecture 1006 may execute on hardware such as a machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or storage modules 1056, which also have the executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive a response to the API calls 1008 as messages 1012. The layers illustrated are representative in nature and not all software architectures have all layers. For example, some mobile or special-purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various GUI functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Figure 11:
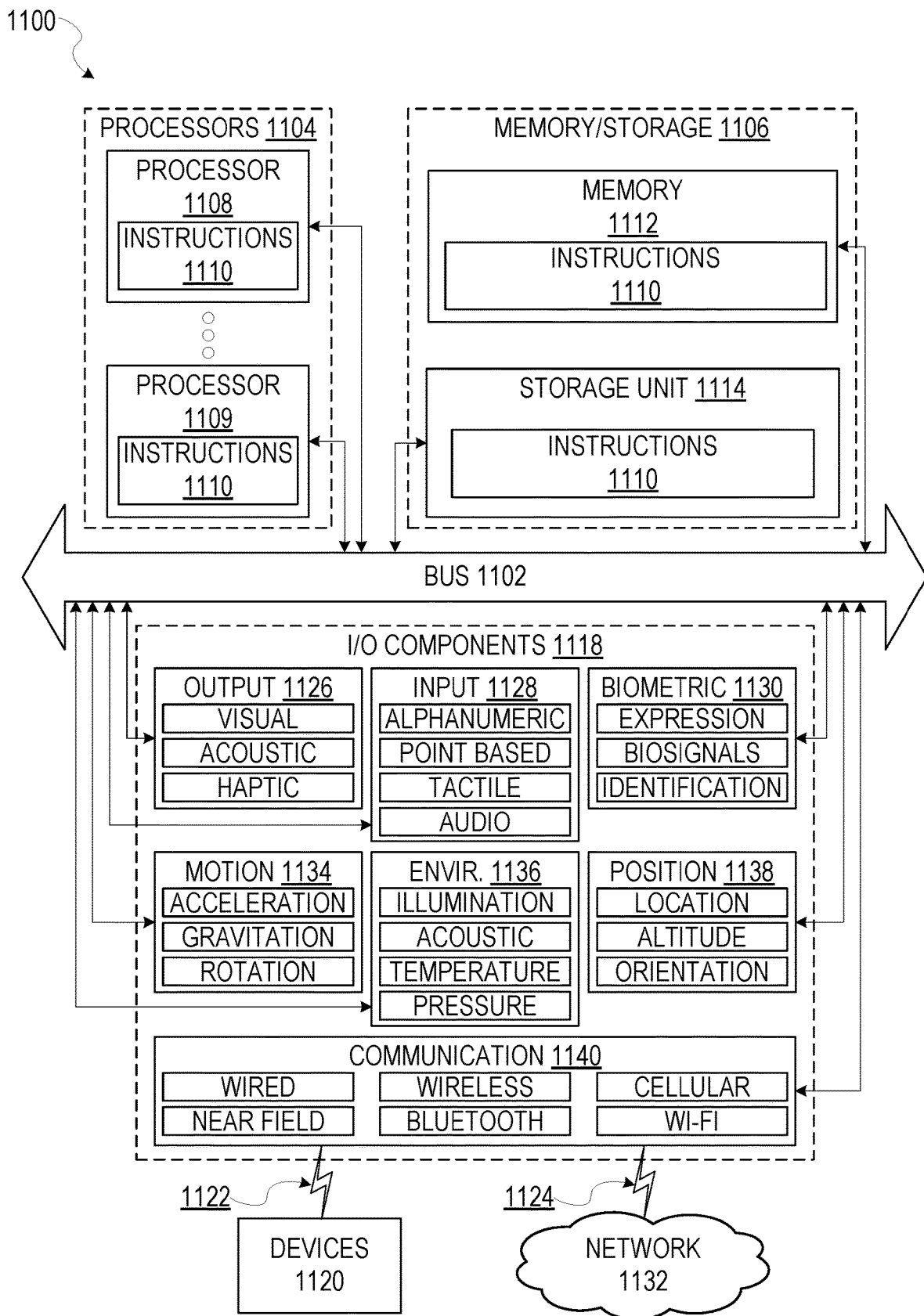
FIG. 11 is a block diagram illustrating components of a machine able to read instructions from a machine-readable medium (e.g., a machine-readable storage medium) and perform any one or more of the methodologies discussed herein, according to example embodiments.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. In an example embodiment, the processors 1104 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1108 and a processor 1109 that may execute the instructions 1110. Although FIG. 11 shows multiple processors 1104, the machine 1100 may include a single processor with a single core, a single processor with multiple cores (e.g., a multi-core processor), multiple processors with a single core, multiple processors with multiple cores, or any combination thereof.

The memory/storage 1106 may include a memory 1112, such as a main memory, or other memory storage, and a storage unit 1114, both accessible to the processors 1104 such as via the bus 1102. The storage unit 1114 and memory 1112 store the instructions 1110 embodying any one or more of the methodologies or functions described herein. The instructions 1110 may also reside, completely or partially, within the memory 1112, within the storage unit 1114, within at least one of the processors 1104 (e.g., within the processor's cache memory), or any suitable combination thereof, during execution thereof by the machine 1100. Accordingly, the memory 1112, the storage unit 1114, and the memory of the processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion, and the grouping is in no way limiting. In various example embodiments, the I/O components 1118 may include output components 1126 and input components 1128. The output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1118 may include biometric components 1130, motion components 1134, environment components 1136, or position components 1138, among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1138 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122, respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:
1. A method comprising:
    generating, by an application executing on a first device of a first user, a first interactive interface, the first interactive interface comprising interactive elements for inputting parameters of a real-time communication session, the parameters comprising a session duration and a target location;
    receiving, by at least one hardware processor of a server machine, from the first device of the first user, a request for the real-time communication session based on input received via the first interactive interface, the request identifying the target location and the session duration for the real-time communication session specified by the first user, the session duration defining a time limit for the real-time communication session;

establishing the real-time communication session between the first user and a second user based on the request, the establishing of the real-time communication session comprising:

generating, by the application executing on the first device, a second interactive interface comprising a live camera feed generated at a second device associated with the second user, the second device comprising a camera to generate the live camera feed and optical elements that comprise a transparent display, the live camera feed comprising images of a real-world environment visible to the second user via the transparent display, the second interactive interface comprising an indicator of a time remaining in the session duration and, a set of selectable virtual content items for application by the first user to the real-world environment that is visible to the second user, and enabling, by the at least one hardware processor of the server machine, an audio communication link between the first device and the second device;

based on input indicative of a selection by the first user of a virtual content item from the set of virtual content items, generating a display, at the transparent display of the second device, of the virtual content item overlaid on the real-world environment that is visible to the second user based on instructions received from the server machine, the virtual content item providing an indication of the target location to the second user;

determining, by the at least one hardware processor of the server machine, a numeric value associated with participation of the second user in the real-time communication session based in part on a combination of the session duration specified by the first user and a distance between the target location and the location of the second device upon receiving an invitation to join the real-time communication session; and updating, by the at least one hardware processor of the server machine, a user account of the second user based on the numeric value associated with the participation of the second user in the real-time communication session.

2. The method of claim 1, further comprising:
transmitting a notification of the request to the second device, the notification comprising the invitation to join the real-time communication session; and
receiving, from the second device, an indication of acceptance of the invitation to join the real-time communication session by the second user, wherein the establishing of the real-time communication session is based on receiving the indication.

3. The method of claim 2, wherein: the invitation to join the real-time communication session is transmitted to the second device based on detecting the second device being within a predefined distance of the target location specified by the request.

4. The method of claim 3, wherein the determining of the numeric value associated with the participation comprises determining the distance between the location of the second device and the target location specified in the request.

5. The method of claim 2, wherein:
the request specifies an identifier associated with the second user, and
the invitation to join the real-time communication session is transmitted to the second device based on the identifier specified in the request.

6. The method of claim 2, further comprising:
identifying a set of candidate users for participating in the real-time communication session based on the request, the set of candidate users comprising the second user; and
providing the notification to a set of devices associated with the set of candidate users, the set of devices comprising the second device.

7. The method of claim 1, wherein:
the request specifies one or more activities to be performed by the second user during the real-time communication session, and
the determining of the numeric value is based in part on the one or more activities to be performed.

8. The method of claim 1, wherein the numeric value is further based on a rate specified in the request.

9. The method of claim 1, further comprising causing display, by the first device, of the virtual content item overlaid on the real-world environment that is visible to the second user.

10. The method of claim 1, wherein numeric value is determined based on an amount of value specified in the request.

11. The method of claim 1, wherein the updating of the user account of the second user comprises increasing or decreasing an amount of value associated with the user account.

12. The method of claim 1, further comprising:
terminating the real-time communication session between the first and second user, the terminating of the real-time communication session comprising:
terminating the display of the live camera feed by the first device; and
disabling the audio communication link between the first device and the second device,
wherein the updating of the user account of the second user is based on terminating the real-time communication session.

13. The method of claim 12, further comprising:
detecting expiration of the session duration specified by the first user, wherein the terminating of the display of the live camera feed by the first device is in response to detecting the expiration of the session duration.

14. The method of claim 1, wherein:
the live camera feed is generated by a camera that is embedded in a wearable device worn by the second user; and
the wearable device is communicatively coupled to the second device.

15. The method of claim 1, wherein the virtual content item comprises an arrow pointed at the target location.

16. A system comprising:
a first device configured, by an application executing on the first device, to perform operations comprising generating a first interactive interface comprising interactive elements for a first user to input parameters of a real-time communication session, the parameters comprising a session duration and a target location
a second device comprising:
optical elements that comprise a transparent display; and
a camera to generate a live camera feed comprising images of a real-world environment visible to a second user of the second device via the transparent display; and
a server machine comprising a memory that stores instructions and one or more processors configured by the instructions to perform operations comprising:

receiving, from the first device, a request for a real-time communication session based on input received via the first interactive interface, the request comprising the target location and the session duration for the real-time communication session specified by the first user, the session duration defining a time limit for the real-time communication session;

establishing the real-time communication session between the first user and a second user based on the request, the establishing of the real-time communication session comprising:

enabling the application executing on the first device to access the live camera feed generated by the camera of the second device; and enabling an audio communication link between the first device and the second device;

the first device further configured by the application to generate a second interactive interface comprising:

the live camera feed generated by the camera of the second device;

an indicator of a time remaining in the session duration, a set of selectable virtual content items for application by the first user to the real-world environment that is visible to the second user, and the second device to generate a display, at the transparent display, of a virtual content item from the set of virtual content items, overlaid on the real-world environment that is visible to the second user based on instructions received from the server machine, the virtual content item providing an indication of the target location to the second user;

the server machine to perform additional operations comprising:

determining a numeric value associated with participation of the second user in the real-time communication session based in part on combination of the session duration specified by the first user and a distance between the target location and a location of the second device upon receiving an invitation to join the real-time communication session; and updating a user account of the second user based on the numeric value associated with the participation of the second user in the real-time communication session.

17. The system of claim 16, wherein the operations further comprise:

transmitting a notification of the request to the second device, the notification comprising an invitation to join the real-time communication session; and receiving, from the second device, an indication of acceptance of the invitation to join the real-time communication session by the second user, wherein the establishing of the real-time communication session is based on receiving the indication.

18. The system of claim 17, wherein the operations further comprise:

identifying a set of candidate users for participating in the real-time communication session based on the request, the set of candidate users comprising the second user; and providing the notification to a set of devices associated with the set of candidate users, the set of devices comprising the second device.

19. The system of claim 16, wherein the operations further comprise:

terminating the real-time communication session between the first and second user, the terminating of the real-time communication session comprising terminating the display of the live camera feed by the first device, and the updating of the user account of the second user based on terminating the real-time communication session.

20. Non-transitory machine-readable media storing instructions that, when executed by a communication system comprising at least a first device of a first user, a second device of a second user, and a server system, cause the communication system to perform operations comprising:

generating, at the first device of the first user, a first interactive interface by an application executing on the first device, the first interactive interface comprising interactive elements for inputting parameters of a real-time communication session, the parameters comprising a session duration and a target location;

receiving, from the first device of the first user, a request for a real-time communication session based on input received via the first interactive interface, the request comprising a target location and a session duration for the real-time communication session specified by the first user, the session duration defining a time limit for the real-time communication session;

establishing the real-time communication session between the first user and the second user based on the request, the establishing of the real-time communication session comprising:

enabling, by the server system, the application executing on the first device to access a live camera feed generated at the second device associated with the second user, the second device comprising a camera to generate the live camera feed and optical elements that comprise a transparent display, the live camera feed comprising images of a real-world environment visible to the second user;

generating, by the application executing on the first device, a second interactive interface comprising the live camera feed generated at the second device associated with the second user, the second interactive interface comprising an indicator of a time remaining in the session duration and a set of selectable virtual content items for application by the first user to the real-world environment that is visible to the second user; and enabling, by the server system, an audio communication link between the first device and the second device;

based on input indicative of a selection by the first user of a virtual content item from the set of virtual content items, generating, at the transparent display of the second device, a display of the virtual content item overlaid on the real-world environment that is visible to the second user based on object definition data received from a server machine, the virtual content item providing an indication of the target location to the second user;

determining, by the server system, a numeric value associated with participation of the second user in the real-time communication session based in part on a combination of the session duration specified by the first user and distance between the target location and a location of the second device upon receiving an invitation to join the real-time communication session; and updating, by the server system, a user account of the second user based on the numeric value associated with the participation of the second user in the real-time communication session.

* * * * *